United States Patent [19]
Crabbe

[11] 3,872,107
[45] Mar. 18, 1975

[54] DIFLUOROMETHYLENE SUBSTITUTED PROSTAGLANDIN INTERMEDIATES

[75] Inventor: Pierre Crabbe, Mexico City, Mexico

[73] Assignee: Syntex (U.S.A.) Inc., Palo Alto, Calif.

[22] Filed: Mar. 12, 1974

[21] Appl. No.: 450,353

Related U.S. Application Data

[62] Division of Ser. No. 287,333, Sept. 8, 1972, abandoned.

[52] U.S. Cl........... 260/343.3, 260/240 R, 260/253, 260/293.65, 260/345.9, 260/347.8, 260/410, 260/464, 260/468 B, 260/468 R, 260/476, 260/482 R, 260/484 A, 260/484 R, 260/485 L, 260/487, 260/488 R, 260/586 R, 260/611 R, 260/611 A, 424/253, 424/267, 424/279, 424/283, 424/285, 424/298, 424/305

[51] Int. Cl............................................. C07d 5/40

[58] Field of Search................................ 260/343.3

[56] References Cited
OTHER PUBLICATIONS

Fieser and Fieser, Reagents for Organic Synthesis, Vol. 3 Wiley – Interscience, p. 265.

Crabbe et al., Synthesis of Difluoromethylene – Prostaglardins Tetrafedron Letters, No. 16, pp. 1319–1321, 1973.

*Primary Examiner*—Donald G. Daus
*Assistant Examiner*—Anne Marie T. Tighe
*Attorney, Agent, or Firm*—Gerard A. Blaufarb; Lawrence S. Squires; William B. Walker

[57] ABSTRACT

$9\alpha,15\alpha$-Dihydroxy-$11\alpha,12\alpha$-difluoromethylene-prosta-13-trans-enoic acid and 5-cis-13-transdienoic acid, 9-keto-$11\alpha,12\alpha$-difluoromethylene-$15\alpha$-hydroxyprosta-13-trans-enoic acid and 5-cis-13-trans-dienoic acid, the $11\beta,12\beta$-difluoromethylene-12-epi compounds, as well as the pharmaceutically acceptable, non-toxic esters and salts thereof, process for the production of same and intermediates obtained by this process. These compounds possess prostaglandin-like activity and thus are useful in the treatment of mammals, where prostaglandins are indicated.

4 Claims, No Drawings

DIFLUOROMETHYLENE SUBSTITUTED PROSTAGLANDIN INTERMEDIATES

This is a division of application Ser. No. 287,333 filed Sept. 8, 1972, now abandoned.

The present invention relates to certain novel prostaglandin derivatives, to a process for the production thereof and to certain novel intermediates obtained by this process.

In a further aspect, the present invention relates to prosta-13-trans-enoic acid derivatives and 5-cis-13-trans-dienoic acid derivatives having a difluoromethylene (difluorocyclopropyl) group attached to the C-11,12 positions, and oxygenated functions at C-9 and C-15 positions of the molecule.

Prostaglandins are members of a new class of hormonal agents with a remarkable range of biological and pharmaceutical properties. These compounds belong to a group of chemically related 20-carbon chain hydroxy fatty acids containing a five membered ring in the structure and different degrees of unsaturation, a number of which have been reported in the literature. For a review on prostaglandins and the definition of primary prostaglandins, see for example S. Bergstrom, *Recent Progress in Hormone Research*, 22, pp. 153–175 (1966) and *Science*, 157, page 382 (1967) by the same author.

Prostaglandins are widely distributed in mammalian tissues and have been isolated from natural sources in very small amounts. In addition, a number of the natural occurring prostaglandins have been prepared by chemical synthesis; note, for example, *J. Am. Chem. Soc.*, 91, page 5675 (1969); *J. Am. Chem. Soc.*, 92, page 2586 (1970) and *J. Am. Chem. Soc.*, 93, pages 1489–1493 (1971) and references cited therein, W. P. Schneider et al., *J. Am. Chem. Soc.*, 90, page 5895 (1968); U. Axen et al., *Chem. Commun.*, page 303 (1969) and W. P. Schneider, *Chem. Commun.*, page 304 (1969).

Because of the remarkable range of biological and pharmacological properties exhibited by this family of compounds, a great deal of interest has focused upon such compounds, and the preparation of analogs of such compounds; accordingly, we have discovered processes and intermediates for preparing modified prostaglandins and derivatives thereof.

The novel prostaglandin derivatives of the present invention can be represented by the following formulas:

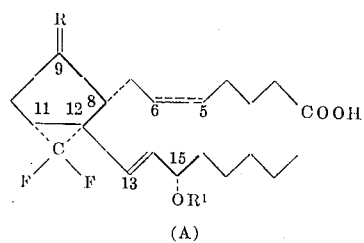

(A)

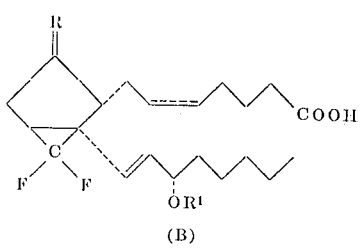

(B)

wherein R represents a keto group or the grouping

wherein $R^2$ is hydrogen, a hydrocarbon carboxylic acyl radical containing up to 12 carbon atoms or a lower alkyl, tetrahydropyran-2-yl, tetrahydrofuran-2-yl or 4-methoxytetrahydropyran-4-yl group and $R^1$ is hydrogen, a hydrocarbon carboxylic acyl radical containing up to 12 carbon atoms or a lower alkyl, tetrahydropyran-2-yl, tetrahydrofuran-2-yl or 4-methoxytetrahydropyran-4-yl group, and the ———— indicates a saturated bond or a cis-olefin bond;

and the pharmaceutically acceptable non-toxic esters and salts thereof.

The compounds of the invention which are intermediates for the compounds of formula A and B can be represented by the following formulas:

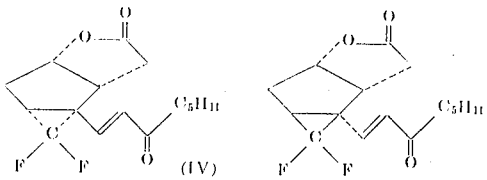

The dotted lines shown in the above formulas (A, B, IV and V) and in the formulas below indicate that the substituents are in the α configuration, i.e. below the plane of the cyclopentane ring.

The compounds of formula (A) possess the side chains at C-8 and C-12 and in trans configuration as do the natural prostaglandins. In contrast to this both side chains in compounds of formula (B) are in α orientation, thus they are cis with respect to the cyclopentane nucleus.

The double bonds in the compounds of formulas (A) and (B) of the invention have the same configuration as in natural prostaglandins of the $E_1$ or $E_2$ or $F_{1\alpha}$ or $F_{2\alpha}$ series, i.e. the double bond at C-5,6 is in cis configuration and the double bond at C-13,14 is in trans configuration.

The compounds of formulas (A) and (B) possess asymmetric centers and thus can be produced as racemic mixtures. The racemic mixtures can be resolved, if desired, at appropriate stages by methods known to the skilled in the art, to obtain the respective individual (d) and (l) isomers. It is to be understood that the individual optical isomers, as well as mixtures of such isomers, are encompassed within the scope of the present invention.

As used herein above and below, the following terms have the following meanings unless expressly stated to the contrary. The term "lower alkyl" refers to an alkyl group containing one through five carbon atoms including straight and branched chain groups and cycic alkyl groups, for example, methyl, ethyl, n-propyl, isopropyl, n-butyl, isobutyl, secbutyl, t-butyl, n-phenyl, isopentyl, sec-pentyl, t-pentyl, cyclopropyl, cyclobutyl and cyclopentyl.

The term "hydrocarbon carboxylic acyl," used herein, refers to those physiologically acceptable acyl groups, conventionally employed in the pharmaceutical art, which can be completely saturated or possess varying degrees of unsaturation and can be optionally substituted by pharmaceutically acceptable groups such as, for example, halo, nitro and amino groups.

Typical acyl groups are acetate, propionate, butyrate, trimethylacetate, valerate, methylethylacetate, caproate, t-butylacetate, 3-methylpentanoate, enanthate, caprylate, triethylacetate, pelargonate, decanoate, undecanoate, benzoate, phenylacetate, diphenylacetate, cyclopentylproprionate, acetoxyacetate, methoxyacetate, aminoacetate, diethylaminoacetate, trichloroacetate, $\beta$-chloropropionate, bicyclo [2.2.2]-octane-1-carboxylate, adamantoate, glycolate, hemisuccinate, hemiadipate, hemi-$\beta,\beta$-dimethylglutarate, 2-chloro-4-nitrobenzoate, piperidino acetate and the like.

The term "pharmaceutically acceptable esters and salts" refers to those esters and salts which do not significantly adversely affect the pharmacological properties of the parent compound. Preferably the ester is derived from carboxylic acids having from one through 12 carbon atoms. Suitable pharmaceutically acceptable salts include, for example, metal salts such as sodium, potassium, calcium, magnesium, aluminum, and the like, as well as organic amine salts such as diethylamine, $\beta$-(dimethylamino)ethanol, $\beta$-(diethylamino)ethanol, lysine, arginine, caffeine, procaine, N-ethylpiperidine and the like.

Our process for preparing the intermediates and $E_2$ series of prostaglandin derivatives of the present invention can be schematically represented by the following sequence of overall reaction equations:

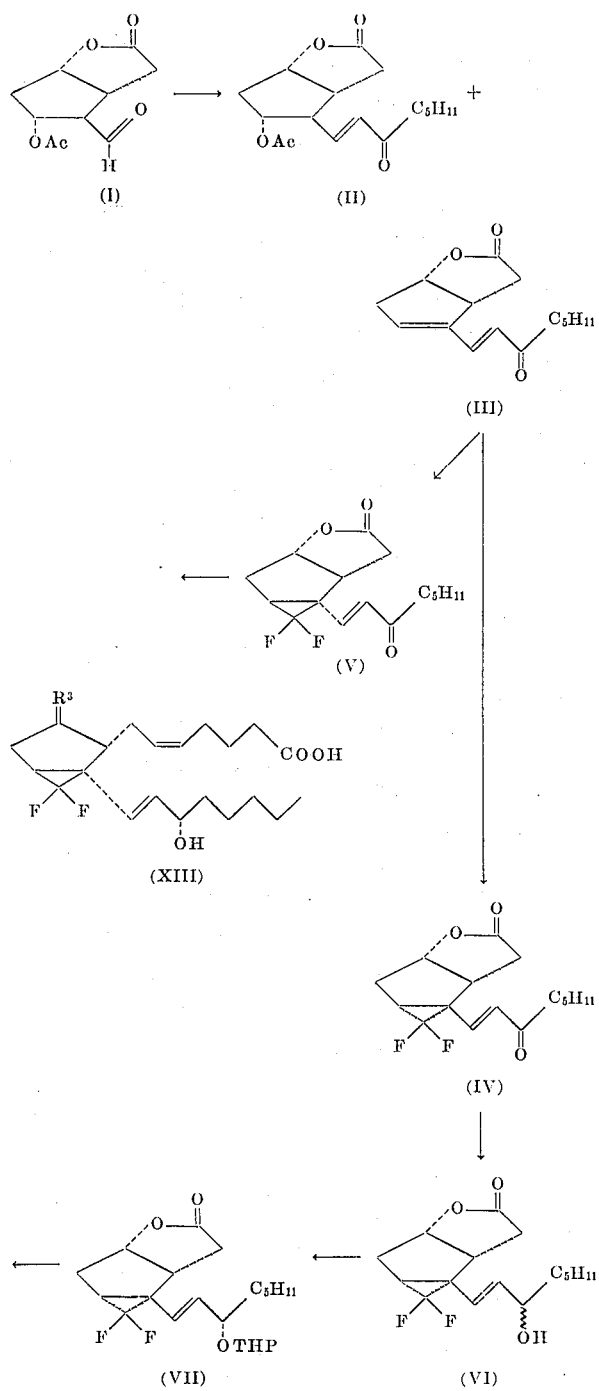

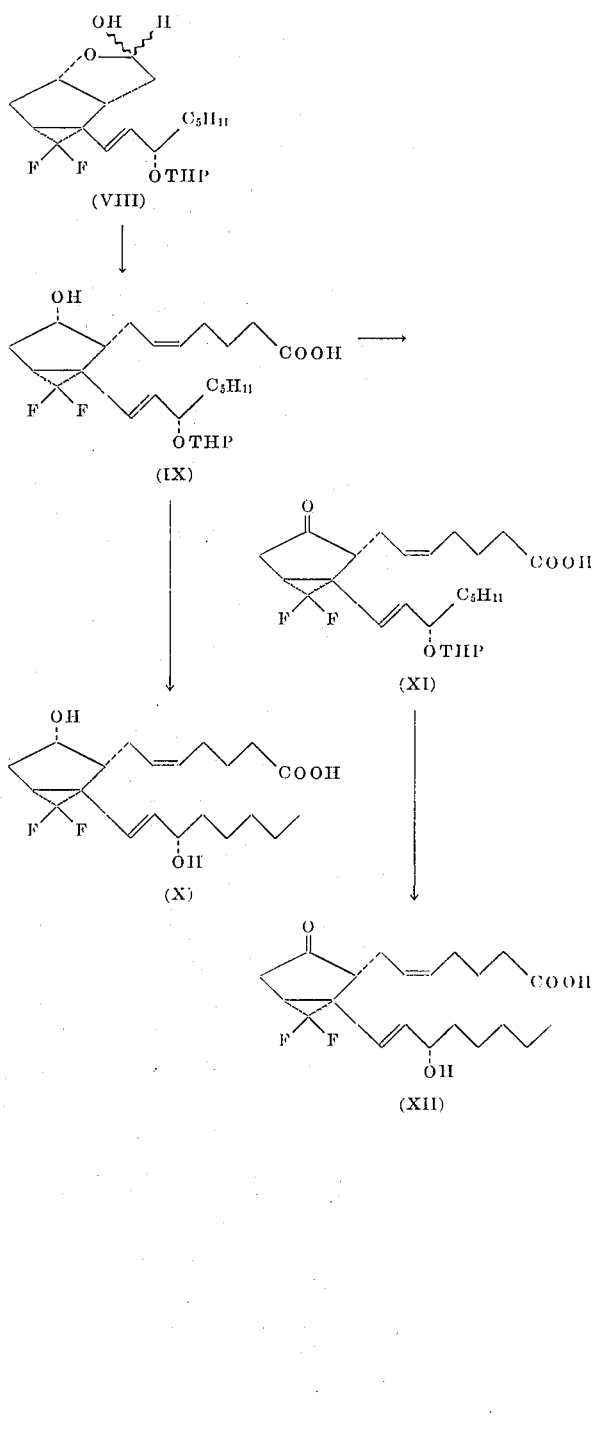

wherein $R^3$ represents a keto group or $\alpha$-hydroxy-$\beta$-hydrogen; THP is tetrahydropyranyl and Ac is acetyl; the wavy lines (⌇) indicate the $\alpha$ or $\beta$ configuration, or mixtures thereof.

In practicing the process illustrated above, the starting compound, namely (2'$\alpha$-hydroxy-4'$\alpha$-acetoxy-5'$\beta$-formylcyclopent-1'$\alpha$-yl)-acetic acid 1,2'-lactone, represented by formula I is treated with the sodium anion of dimethyl 2-oxoheptylphosphonate in dimethoxyethane, to produce a mixture of the trans enone and dienone lactones of formulas II and III, respectively, which are separated by conventional techniques. In addition, acid or base treatment of II affords III, thus increasing the yield of the latter compound. This alkylation involves a modified Wittig reaction. Procedures for the Wittig reaction are well known in the art, see for example S. Trippet et al., *Adv. in Organic Chemistry*, Vol. 1, pages 83–102, S. Trippet, *Quarterly Reviews*, Vol. 17, pages 400–440. The sodium anion of dimethyl 2-oxoheptylphosphonate is prepared in accordance with the method described by E. Corey et al., *J. Am. Chem. Soc.*, 88, 5654 (1966). The reaction is preferably conducted under an inert atmosphere, i.e. under nitrogen or argon atmosphere at temperatures of about from 0°C to 40°C, preferably at room temperature or below, using at least one molar equivalent of the reagent per mole of aldehyde, and preferably 1.2 to 2 moles. This reaction is typically carried out for a period of about one to four hours, depending on the temperature and concentration of the reaction mixture. In the preferred conditions, the reaction is conducted at room temperature for about two hours. The reaction product can be recovered from the reaction mixture by neutralization of the excess base with acetic acid to pH~7, followed by evaporation of the solvent under high vacuum, at low temperature, or by adding water and extracting the product with an adequate solvent immiscible with water, e.g. methylene chloride, diethyl ether and the like, followed by evaporation of the solvent. Compounds II and III are separated by conventional techniques, such as chromatography on silica gel or thin-layer chromatography (t.l.c.).

In the keystone step of our process the dienone of formula III is then treated with difluorocarbene in a suitable organic solvent resulting in the addition of difluorocyclopropyl group across the double bond most remote to a keto group, i.e. the ring double bond, thus affording a mixture of the two epimeric difluoromethylene compounds of formulas IV and V in which the fused difluorocyclopropyl group is in $\alpha$ or $\beta$ configurations, respectively. The side chain in compound of formula IV is in $\beta$ configuration, i.e. it has the configuration required for natural prostaglandins, while the compound of formula V has the side chain attached in $\alpha$ configuration. These isomers are readily separated by conventional techniques, known to the skilled in the art.

In the preferred embodiments, the reaction is conducted under anhydrous conditions, using sodium chlorodifluoroacetate as source of difluorocarbene, at a temperature above which the salt decomposes, using an inert nonaqueous solvent of sufficient polarity to dissolve the haloacid salt. Suitable solvents include dimethoxyethane, diethyleneglycol dimethyl ether (diglyme), triethylene glycol dimethyl ether and the like. Generally, the reaction is performed at temperatures in the range of about from 80° to 180°C and preferably at the boiling point of the solvent used, for a period of time of about 5 minutes to 1 hour. The course of the reaction can be monitored by thin-layer chromatography or by determination of the UV spectrum.

Alternatively, this difluorocyclopropyl addition can be effected with other reagents known to generate difluorocarbenes such as phenyl (trifluoromethyl) mercury and trimethyl (trifluoromethyl) tin in the presence of sodium iodide in an aromatic hydrocarbon solvent, at or near the boiling point of the solvent used for a period of time of the order of about two to about 18 hours.

The difluoromethylene compounds of formulas IV and V can be separated by conventional techniques such as fractional crystallization, column chromatography or thin-layer chromatography. The individual isomers are in turn submitted separately to the same sequence of reactions in order to obtain the difluoromethylene prostaglandin analogs object of the invention.

Thus, the keto group of the enone lactone of formula IV can be selectively reduced with a solution of zinc borohydride in an ether solvent such as dimethoxyethane, to yield a mixture of the $\alpha$-hydroxy compound and its $\beta$ epimer (R and S isomers) compounds of formula VI. The reaction is conducted at temperatures in the range of about from 5° to 20°C for about from 15 minutes to 3 hours, preferably using an excess of zinc borohydride. The zinc borohydride reagent solution can be prepared from freshly fused zinc chloride and sodium borohydride in dimethoxyethane.

The epimeric $\alpha$- and $\beta$-hydroxy compounds can be separated, if desired, by conventional chromatography on silica gel or by thin-layer chromatography. In addition, the $\beta$-epimer can be converted into the starting enone IV by reaction with manganese dioxide in methylene chloride or chloroform or with 2,3-dichloro-5,6-dicyano-1,4-benzoquinone in dioxane, according to known methods for the preparation of $\alpha$,$\beta$-unsaturated ketones from allylic alcohols.

Alternatively, the reduction step can be carried out via treatment with a borohydride ion (conveniently prepared by reaction of a trialkylborane derivative from either racemic or (+)-limonene, thexylborane and t-butyl lithium) in the presence of hexamethylphosphoramide, at about from −130°C to −100°C and preferably −120°C. The predominant product of this treatment is the $\alpha$-alcohol (VI) and only small or negligible amounts of the $\beta$-epimer is obtained.

The $\alpha$-hydroxy compound of formula VI can be etherified with dihydropyran in methylene chloride, in the presence of catalytic amounts of an acid catalyst (e.g. p-toluenesulfonic acid), under anhydrous conditions, to produce the tetrahydropyranyloxy derivative of formula VII. Typically the reaction is conducted at about room temperature for about 15 minutes, using about three molar equivalents of dihydropyran in an inert organic solvent, e.g. using methylene chloride as solvent. A larger excess of dihydropyran, or longer reaction periods, produce polymerization of this reagent.

The product can be isolated by adding a few drops of pyridine to the reaction mixture, followed by conventional extraction and evaporation of the organic extract.

The isomeric lactol of formula VIII can be prepared by reduction of the lactone of formula VII with about from 1.1 to 3 molar equivalents of diisobutylaluminum hydride in a suitable inert organic solvent. Typically the reduction is conducted at about from −30° to −70°C, preferably at about −60°C, for a period of about from 10 to 30 minutes, preferably using about two molar equivalents of the diisobutylaluminum hydride. Suitable inert organic solvents for this reaction include, for example, the aromatic hydrocarbons such as toluene or xylene.

The product can be isolated from the reaction mixture by conventional separation procedures and can be used for the next step with or without separation of the isomers.

The 11α,12α-difluoromethylene prostadienoic acid derivative of formula IX can be prepared by condensation of the crude lactol VIII with the Wittig reagent derived from 5-triphenylphosphoniopentanoic acid and sodium methylsulfinylcarbanion in dimethylsulfoxide solution.

Typically this reaction is conducted under anhydrous conditions for about two to 24 hours at temperatures in the range of about from 15° to 50°C. This reaction is preferably carried out under an inert atmosphere, e.g. under argon or nitrogen atmosphere. Typically the triphenylphosphoniopentanoic acid is used in an amount varying from about two to about five moles per mole of starting lactol VIII and the amount of sodium methylsulfinyl carbanion vary between about two to about 10 moles. In the preferred embodiments 2.5 molar equivalents of the acid reagent and five molar equivalents of the carbanion reagent are used per mole of lactol. The product is obtained as the sodium salt soluble in water, which can be converted to the free acid by acidification with oxalic acid or another weak acid to pH 2, followed by conventional extraction and evaporation. Preferably the prostaglandin derivative (IX) is further purified by thin-layer chromatography. The 5-triphenylphosphoniopentanoic acid can be prepared according to the procedure described by R. Greenwald et al., in *J. Org. Chem.*, 28, page 1128 (1963), from 5-bromopentanoic acid and triphenylphosphine in acetonitrile. The sodium methylsulfinyl carbanion can be obtained from sodium hydride and dimethylsulfoxide, stirring the mixture at about 75°C until the evolution of gas ceases. Generally, it is preferred to prepare these reagents just prior to the reaction with the lactol of formula VIII.

The compound of formula X(9α,15α-dihydroxy-11α,12α-difluoromethyleneprosta-5,13-dienoic acid) can be prepared by hydrolyzing the tetrahydropyranyloxy function from the corresponding compound of formula IX, under mild acidic conditions, for example, by treatment with a weak acid (e.g. acetic acid, oxalic acid, tartaric acid and the like) in the presence of water. Preferably the starting material of formula IX is first dissolved in an inert water miscible organic solvent (e.g. tetrahydrofuran, dioxane and the like) prior to treatment with the weak acid. This hydrolysis is preferably conducted using aqueous acetic acid, at a temperature in the range of about from 0° to 50°C for about 4 to 10 hours. The preferred concentration of aqueous acetic acid is 65% wt./wt. however, other concentrations can, of course, also be used.

The 15-tetrahydropyranyloxy-9-keto-11α, 12α-difluoromethyleneprosta-5,13-dienoic acid can be prepared by oxidation of the corresponding 9α-hydroxylated compound of formula IX with Jones' reagent or with aqueous chromic acid in diethyl ether (H. C. Brown et al., *J. Org. Chem.*, 36, page 387 (1971)). This product can in turn be hydrolyzed under mild acidic conditions as described herein above, to afford 9-keto-11α,12α-difluoromethylene-15α-hydroxyprosta-5,13-dienoic acid (XII).

When the above described reaction sequence for the introduction of the carboxylic acid side chain and formation of the prostaglandin derivative (IV → VI → X and XII) is carried out with the β,β-difluoromethylene isomer of formula V (namely [2'α-hydroxy-4'β,5'β-difluoromethylene-5α-(3''-oxo-oct-1'''(t)-en-1'''-yl)-cyclopent-1'α-yl]-acetic acid 1,2'-lactone) there are obtained as final products 9α,15α-dihydroxy-11β, 12β-difluoromethylene-12-epiprosta-5,13-dienoic acid (XIII, $R^3$=β-hydrogen-α-hydroxy) and 9-keto-11β,12β-difluoromethylene-15α-hydroxy-12-epiprosta-5,13-dienoic acid (XIII, $R^3$ = keto).

The compounds of formulas A and B, of the invention, having a saturated linkage between the C-5 and C-6 carbon atoms can be conveniently prepared by selectively reducing the C-5(6)-olefin bond in the corresponding dienoic compounds of formulas A and B. This can be conveniently effected by applying the procedure described by Koch et al. in the *Journal of Labelled Compounds*, Vol. VI. No. 4, page 395 (1970), with respect to the selective reduction of $PGE_2$ prostaglandins to $PGE_1$ prostaglandins, to the dienoic compounds of formulas A and B.

The hydroxyl groups in the difluoromethylene compounds of the invention can be esterified in a conventional manner to produce mono-, or diesters or mono-, or diethers, depending upon the particular prostaglandin derivative. For example, esterification can be accomplished by reaction of the hydroxylated compound with the desired carboxylic acid anhydride or chloride in pyridine solution.

Etherification of the hydroxyl groups can also be carried out by conventional techniques. For example, by reaction with dihydropyran, dihydrofuran or 4-methoxy-5,6-dihydro-2H-pyran in an inert solvent such as, for example, benzene or methylene chloride and in the presence of an acid catalyst (e.g. p-toluenesulfonic acid) produces the tetrahydropyran-2'-yloxy, tetrahydrofuran-2'-yloxy or 4'-methoxytetrahydropyran-4'-yloxy derivatives, respectively. Methyl, ethyl, and cyclopentyl ethers can, for example, be prepared by reaction of the hydroxylated compound with sodium hydride and methyl iodide, ethyl iodide, and cyclopentyl bromide, respectively.

Although the esterification or etherification reactions are usually effected using an excess of the esterifying or etherifying agents, it is preferable to use at least one molar equivalent of said reagents per hydroxyl group present in the starting compound.

The alkyl esters of the carboxy acid function can be prepared by treatment of the free acid with an excess of a diazoalkane such as diazomethane, diazoethane or diazopropane in ether or methylene chloride solution, in a conventional manner.

The salt derivatives of the prostadienoic acids of the present invention can be prepared by treating the corresponding free acids with about one molar equivalent of a pharmaceutically acceptable base per molar equivalent of free acid. Suitable pharmaceutically acceptable bases include, for example, sodium hydroxide, potassium hydroxide, ammonium hydroxide, calcium hydroxide, trimethylamine, triethylamine, tripropylamine, β(dimenthylamio)ethanol, β-(diethylamino)ethanol, arginine, lysine, caffeine, procaine or the like. Typically the reaction is conducted in an aqueous solution, alone or in combination with an inert, water miscible organic solvent, at a temperature of about from 0° to 30°C, preferably at room temperature.

The starting material used in the above process, i.e. (2'α-hydroxy-4'α-acetoxy-5'β-formylcyclopent-1'α-yl)-acetic acid 1,2'-lactone, is prepared in accordance with the methods described, for example, by E.J. Corey et al., in *J. Am. Chem. Soc.*, 91, page 5675 (1969); *J. Am. Chem. Soc.*, 92, page 1397 (1970); *J. Am. Chem. Soc.*, 93, page 1489, 1490 and 1491 (1971) and references cited therein, as illustrated by the following sequence of reactions:

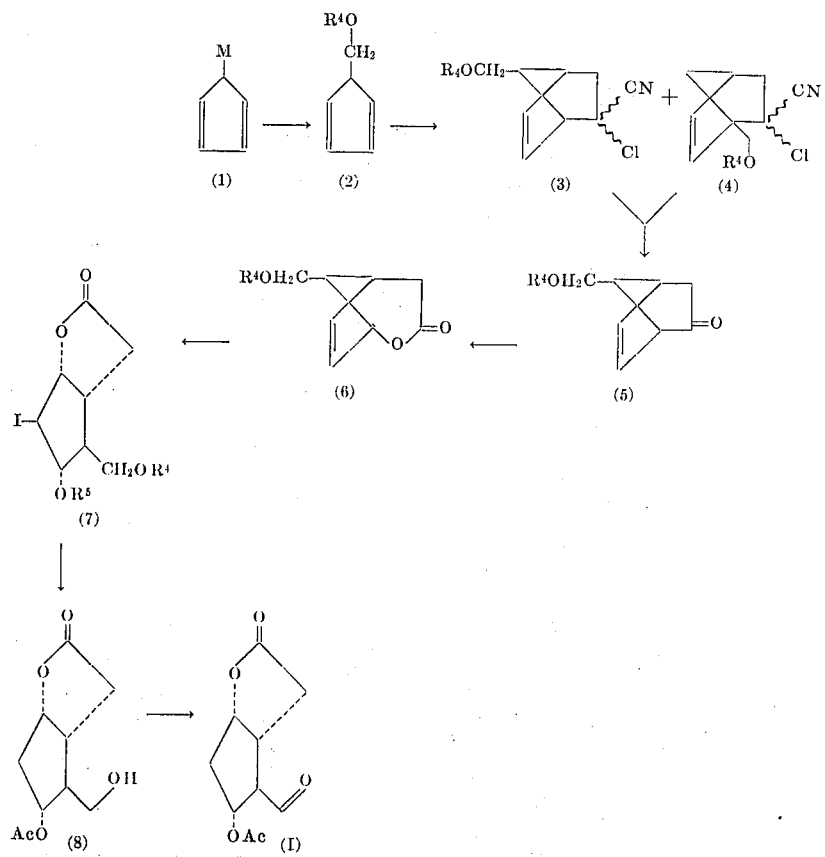

Typical inert, water miscible organic solvents include methanol, ethanol, isopropanol, butanol, dioxane or tetrahydrofuran. When divalent metal salts are prepared, such as the calcium salts or magnesium salts, the free acid starting material is treated with at least one half molar equivalent of the pharmaceutically acceptable base.

In conducting the aforedescribed processes, it is generally preferred to separate or isolate the respective products of each reaction step prior to their use as starting materials in subsequent steps. Illustrative non-limiting separation and isolation procedures can be had by reference to the appropriate Example set forth herein below. Also where pure optical isomer products are desired, such products can be obtained by the use of pure optical isomer starting materials or by resolution of the racemic product (or starting materials) according to conventional procedures such as, for example, described by Corey et al., *J. Am. Chem. Soc.*, 92, page 397 (1970).

Also although the above processes, for purposes of simplicity, have been described with respect to tetrahydropyran and acetate protecting groups, other conventional suitable ether and ester protecting groups could, of course, also be used.

wherein $R^4$ represents methyl or benzyl; $R^5$ represents hydrogen or acetyl; and M represents sodium or thallium.

Briefly, this method comprises the reaction of cyclopentadienylsodium or cyclopentadienyl thallium (1), obtained by reaction of cyclopentadiene with sodium hydride or aqueous thallous sulfate in the presence of potassium hydroxide (E.J. Corey et al, *J. Am. Chem. Soc.*, 93, page 1489 (1971) with a slight excess of chloromethylmethylether or chloromethylbenzylether in tetrahydrofuran at approximately −55°C, to yield respectively the 5-methoxymethyl-1,3-cyclopentadiene 2, ($R^4$ = methyl) or 5-benzyloxymethyl-1,3-cyclopentadiene 2($R^6$ = benzyl) which are subjected to the Diels Alder reaction with an excess (about 5 molar equivalents) of 2-chloroacrylonitrile in the presence of cupric fluoroborate as catalyst to yield a mixture of the endo-exo cyano nitriles of formulas (3) and (4) $R^4$ = methyl or benzyl, respectively). This mixture of stereoisomeric nitriles is treated with potassium hydroxide in dimethylsulfoxide to yield the anti-bicyclic ketones of formula (5), i.e. 7-syn-methoxymethyl-2-norbornen-5-one ($R^4$ = methyl) or 7-syn-benzyloxymethyl-2-norbornen-5-one ($R^4$ = benzyl) respectively, which upon reaction with a slight molar excess of m-chloro-perbenzoic acid in methylene chloride in the presence of sodium bicarbonate result in selective Baeyer-Villiger oxidation to form the corresponding lactone (6), namely 2-oxa-3-oxo-$\Delta^5$-8-syn-methoxymethylbicyclo (3.2.1)-octane, ($R^4$ = methyl) and 2-oxa-3-oxo-$\Delta^5$-8-syn-benzyloxymethylbicyclo (3.2.1) octane ($R^4$ = benzyl). Saponification of the foregoing lactones of formula (6) with 2.5 equivalents of sodium hydroxide in aqueous methanol, followed by neutralization with carbon dioxide and treatment with 2.5 equivalents of aqueous potassium triiodide solution at 0° to 5°C produce the respective hydroxyiodolactones of formula (7), namely (2'$\alpha$,4'$\alpha$-dihydroxy-3'$\beta$-iodo-5'$\beta$-methoxymethylcyclopent-1'$\beta$-methoxymethylcyclopent-1'$\alpha$-yl)-acetic acid 1,2'-lactone ($R^4$ = methyl, $R^5$ = H) and 2'$\alpha$, 4'$\alpha$-dihydroxy-3'$\beta$-iodo-5'$\beta$-benzyloxymethylcyclopent-1'$\beta$-yl)-acetic acid 1,2'-lactone ($R^4$ = benzyl, $R^5$ = H), which are esterified with acetic anhydride in pyridine, under conventional conditions to yield the corresponding acetoxy compound, (7, $R^5$ = acetyl). This compound is then submitted to deiodination using tri-n-butyl tin hydride in the presence of catalytic amounts of azobisisobutyronitrile in benzene solution and thence to cleavage of the 5'$\beta$-benzyloxymethyl or 5'$\beta$-methoxymethyl group to produce the hydroxymethyl compound (8).

The benzyloxymethyl group is cleaved by hydrogenolysis in the presence of paladium charcoal and perchloric acid as catalysts, in a suitable organic solvent. The methoxymethyl group is hydrolyzed by reaction with boron tribromide in methylene chloride at a temperature comprised between about 78°C to 0°C.

Oxidation of the hydroxymethyl compound (8) with chromium trioxide-dipyridine complex (prepared as described by J. C. Collins et al. in *Tetrahedron Letters*, page 3363 (1968) in methylene chloride solution at about 0°C, affords the aldehyde of formula I.

The compounds, esters and salts of the invention exhibit prostaglandin-like biological activities and thus are useful in the treatment of mammals where the use of prostaglandins are indicated. The compounds, esters and salts of the invention are bronchodilators and thus are useful in treating mammals for bronchial spasm or wherever strong bronchodilators are indicated. These compounds are also useful in controlling or palliating hypertension in mammals and further exhibit central nervous system depressant activity in mammals, and are useful as sedatives. In addition, the compounds are useful for inducing labor, in pregnancy, and for inducing menses to correct or reduce menstrual abnormalities.

The compounds and/or salts, of the invention, can be administered in a wide variety of dosage forms, either alone or in combination with other pharmaceutically compatible medicaments, in the form of pharmaceutical compositions suited for oral or parenteral administration or inhalation in the case of bronchodilators. The compounds are typically administered as pharmaceutical compositions consisting essentially of the compounds and/or salts, of the invention, and a pharmaceutical carrier. The pharmaceutical carrier can be either a solid material, liquid, or aerosol, in which the compound and/or salt is dissolved, dispersed or suspended, and can optionally contain small amounts of preservatives and/or pH buffering agents. Suitable preservatives which can be used include, for example, benzyl alcohol and the like. Suitable buffering agents include, for example, sodium acetate and pharmaceutical phosphate salts and the like.

The liquid compositions can, for example, be in the form of solutions, emulsions, suspensions, syrups or elixirs. The solid compositions can take the form of tablets, powders, capsules, pills or the like, preferably in unit dosage forms for simple administration or precise dosages. Suitable solid carriers include, for example, pharmaceutical grades of starch, lactose, sodium saccharin, talcum, sodium bisulfite and the like.

For inhalation administration, the compounds and/or salts can, for example, be administered as an aerosol comprising the compounds or salts in an inert propellant together with a co-solvent (e.g. ethanol) together with optional preservatives and buffering agents. Additional general information concerning the inhalation administration of aerosols can be had by reference to U.S. Pat. Nos. 2,868,691 and 3,095,355.

The compounds of this invention are typically administered in dosages of about from 0.1 to 10 mg. per kg. of body weight. The precise effective dosage will, of course, vary depending upon the mode of administration, condition being treated and host.

A further understanding of the invention can be had from the following Preparations and Examples but are not intended to limit its scope. Further, unless expressly stated to the contrary, racemic mixtures are used as starting materials, and correspondingly, racemic mixtures are obtained as products. Also where needed, Examples are repeated to provide starting materials for subsequent Examples.

PREPARATION 1

A. To a stirred solution of 125 g. of thallium sulfate and 50 g. of potassium hydroxide in 750 ml. of water are added, under an atmosphere of argon, 43 ml. of freshly distilled cyclopentadiene and the mixture is vigorously stirred for 10 minutes; the yellow precipitate formed is filtered off, washed with ice water, methanol and ether, to yield 132 g. of cyclopentadienylthallium.

B. A mixture of 216.28 g. of benzyl alcohol, 61.44 g. of paraformaldehyde, 481.6 g. of anhydrous magnesium sulfate and 1200 ml of methylene chloride is cooled to a temperature of between −50° to −55°C in a dry ice-acetonitrile bath, and the stirred cold solution is saturated with an anhydrous hydrogen chloride gas. The reaction mixture is kept at −50° to −55°C for 10 minutes further, and then the excess of hydrogen chloride is eliminated by passing of stream of nitrogen during 30 minutes. The reaction mixture is filtered and the solid material washed well with pentane, and the combined filtrates are evaporated to dryness at a temperature below 30°C, to produce an oil which is then distilled under reduced pressure to yield chloromethyl benzyl ether.

C. A suspension of 132 g. of cyclopentadienyl thallium in 200 ml. of anhydrous ether is cooled to −20°C in a dry icecarbon tetrachloride bath. To the tooled mixture are added under stirring and under an argon atmosphere, in a 15 minute period, 90 g. of chloromethyl benzyl ether. The reaction mixture is stirred for 3 ½ hours at −20°C, it is then filtered in a filtration flask previously cooled to −78°C and the soilid precipitate washed with cold pentane (−78°C).

The filtered solution is immediatelly added to a mixture of 216 g. of anhydrous α-chloroacrylonitrile and 30 g. of anhydrous cupric fluoroborate, previously cooled to −78°C. The reaction mixture is evaporated to half its original volume at a temperature not higher than 0°C, and the concentrate is stirred at 0°C for 48 hours. The reaction mixture is then poured into 200 ml. of saturated sodium chloride solution and extracted three times with ether. The combined extracts are washed with saturated sodium bicarbonate solution (2 × 200 ml.) and saturated sodium chloride solution (2 × 200 ml.), dried over magnesium sulfate and evaporated to dryness under reduced pressure. The resulting residue is purified by filtration through 100 g. of silica gel using benzene as eluant, thus obtaining the pure 2-chloro-2-cyano-$\Delta^5$-7-syn-benzyloxymethylbicyclo-(2.2.1)-heptane.

PREPARATION 2

To a well-stirred slurry of 74.1 g. of cyclopentadienylthallium in 100 ml. of anhydrous ether cooled to −20° to −22°C (internal temperature) in a dry-ice carbon tetrachloride bath under an argon atmosphere, are added dropwise, in a 15 minute period, 20.13 g. of chloromethyl methyl ether and the slurry is stirred at −20° to −22°C for 7 hours. The reaction mixture is then filtered into a precooled (−70°, dry-ice-acetone) flask and the residue of thallium chloride washed with three 100 ml. portions of cold (−70°C) ether. The combined filtrate is added dropwise from a dropping funnel with a dry-ice to a suspension of 29.65 g. of cupric tetrafluoroborate in 87.5 g. of anhydrous α-chloroacrylonitrile maintained at 0°C. When the addition is complete, the mixture is stirred at 0°C in the dark for 18 hours.

One hundred milliliters of saturated aqueous sodium chloride solution is then added and the reaction mixture extracted with ether. The ether extracts are successively washed with saturated sodium bicarbonate (2 × 100 ml.) and sodium chloride (2 × 100 ml.), and dried over magnesium sulfate. Evaporation under reduced pressure at room temperature gives 2-chloro-2-cyano-$\Delta^5$-7-syn-methoxymethylbicyclo-(2.2.1)-heptane as a clear pale yellow oil.

PREPARATION 3

To a stirred solution of 100 g. of 2-chloro-2-cyano-$\Delta^5$-7-syn-benzyloxymethylbicyclo-(2.2.1)-heptane in 368 ml. of dimethylsulfoxide is added dropwise, in a 15 minute period and under an argon atmosphere, a hot solution of 105.2 g. of potassium hydroxide in 52.6 ml. of water. The reaction mixture is stirred for 28 hours at room temperature, diluted to twice its volume with ice water and extracted several times with ether. The combined organic extract is washed twice with saturated sodium carbonate solution, dried over magnesium sulfate and evaporated to dryness. The residue is purified by distillation under high vacuum (0.6 mm.) to yield 7-syn-benzyloxymethyl-2-norbornen-5-one, homogeneous on thin-layer chromatography.

By the same procedure but using 2-chloro-2-cyano-$\Delta^5$-7-syn-methoxymethylbicyclo-(2.2.1)-heptane in lieu of 2-chloro-2-cyano-$\Delta^5$-7-syn-benzyloxymethybicyclo-(2.2.1) heptane, there is obtained 7-syn-methoxymethyl-2-nonbornen-5-one.

PREPARATION 4

To a suspension of 55 g. of m-chloroperbenzoic acid and 43.5 g. of sodium bicarbonate in 570 ml. of anhydrous methylene chloride are added 57 g. of 7-syn-benzyloxymethyl-2-norbornen-5-one, in a 15 minute period and under stirring, maintaining the temperature at about 25°C. The reaction mixture is stirred for 3 hours further, and diluted with methylene chloride. The resulting mixture is vigorously stirred with 470 ml. of saturated aqueous sodium sulfite solution, the organic layer is separated and washed with saturated sodium sulfite solution. The aqueous phase is extracted with methylene chloride and the combined organic methylene chloride extracts are dried over magnesium sulfate and evaporated to dryness under reduced pressure, thus yielding 2-oxa-3-oxo-$\Delta^5$-8-syn-benzyloxymethylbicyclo-(3.2.1)-octane as a homogeneous oil.

By the same procedure but using 7-syn-methoxymethyl-2-norbornen-5-one in place of 7-syn-benzyloxymethyl-2-norbornen-5-one there is obtained 2-oxa-3-oxo-$\Delta^5$-8-syn-methoxymethylbicyclo-(3.2.1)-octane.

PREPARATION 5

To a solution of 60 g. of 2-oxa-3-oxo-$\Delta^5$-8-syn-benzyloxymethylbicyclo-(3.2.1)-octane in 70 ml. of methanol is added, at 0°C, a solution of 30 g. of sodium hydroxide in 247 ml. of water, and the resulting mixture is stirred at room temperature for 3 hours. The methanol is then evaporated under vacuo at a temperature below 30°C, cooled to 0°C and extracted with ether to eliminate the unsaponified products. The aqueous phase is neutralized with carbon dioxide and immediately treated with a solution of 188.1 g. of iodine and 369 g. of potassium iodide in 275 ml. of water. The reaction mixture is stirred for 48 hours at 0°C and diluted with sodium sulfite solution until complete decoloration. It is then saturated with sodium potassium tartrate and extracted with methylene chloride. The organic extracts are dried over magnesium sulfate and evaporated to dryness under reduced pressure. The oily residue is crystallized from ether-methylene chloride, to yield the pure (2'α, 4'α-dihydroxy-3'β-iodo-5'β-benzyloxymethylcyclopent-1'α-yl)-acetic acid 1,2'-lactone.

By the same procedure, 2-oxa-3-oxo-$\Delta^5$-8-syn-methoxymethylbicyclo-(3.2.1)-octane is converted into (2'α,4'α-dihydroxy-3'β-iodo-5'β-methoxymethylcyclopent-1'α-yl)-acetic acid 1,2'-lactone.

PREPARATION 6

A mixture of 2.5 g. of (2'α,4'α-dihydroxy-3'β-iodo-5'β-benzyloxymethylcyclopent-1'α-yl)-acetic acid 1,2'-lactone, 2.5 ml. of pyridine and 5 ml. of acetic anhydride is kept at room temperaturee for 30 minutes. The solvents are then evaporated under reduced pressure, and the residue crystallized from ether, to yield (2'α-hydroxy-4'α-acetoxy3'β-iodo-5'β-benzyloxymethylcyclopent-1'α-yl)-acetic acid 1,2'-lactone.

In a similar manner (2'α,4'α-dihydroxy-3'β-iodo-5'β-methoxymethylcyclopent-1'β-yl)-acetic acid 1,2'-lactone is converted into the corresponding 4'-acetoxy derivative.

PREPARATION 7

To a solution of 6.2 g. of (2'α-hydroxy-4'α-acetoxy-3'β-iodo-5'β-benzyloxymethylcyclopent-1'α-yl)-acetic acid 1,2'-lactone in 80 ml. of anhydrous benzene (dried over molecular sieves) are added 4.0 g. of tri-n-butyl tin hydride, prepared according to the procedure of H. G. Kuivila and O. F. Beumel, Jr., *J. Am. Chem. Soc.*, 83, page 1246 (1961) and 20 mg. of azobisisobutyronitrile. The reaction mixture is stirred at 50°C for 3 hours then the benzene is removed by evaporation under reduced pressure, the oily residue is dissolved in 150 ml. of ether, and the ethereal solution is washed several times with 5% aqueous sodium hydroxide solution and then with saturated sodium chloride solution, dried over magnesium sulfate and evaporated under vacuo. The residue is dissolved in hexane and filtered through synthetic magnesium silicate, sold under the trademark Fluorisil by the Floridin Company, to remove nonpolar tin by products, and the filtrate is purified by thin-layer chromatography using hexane-ethyl acetate (60:40) is eluant, to yield (2'α-hydroxy-4'α-acetoxy-5'β-benzyloxymethylcyclopent-1'α-yl)-acetic acid 1,2'-lactone.

In a similar manner, (2'α-hydroxy-4'α-acetoxy-3'β-iodo-5'β-methoxymethylcyclopent-1'α-yl)-acetic acid 1,2'-lactone is converted into (2'α-hydroxy-4'α-acetoxy-5'β-methoxymethylcyclopent-1'αyl) acetic acid 1,2'-lactone.

PREPARATION 8

A. To a prehydrogenated suspension of 600 mg. of 10% palladium charcoal catalyst in 20 ml. of ethyl acetate is added 6 g. of (2'α-hydroxy-4'α-acetoxy-5'β-benzyloxymethylcyclopent-1'α-yl)-acetic acid 1,2'-lactone and the mixture is stirred under hydrogen atmosphere until the absorption of hydrogen ceases. The catalyst is then separated by filtration and washed with ethyl acetate. The combined organic filtrates are evaporated to dryness under reduced pressure and the residue is purified by thin-layer chromatography using hexane-ethyl acetate (30:70) as eluant, to yield (2'α-hydroxy-4'α-acetoxy-5'β-hydroxymethylcyclopent-1'α-yl)-acetic acid 1,2'-lactone.

B. A stirred solution of 15 g. of (2'α-hydroxy-4'α-acetoxy-5'β-methoxymethylcyclopent-1'α-yl)-acetic acid 1,2'-lactone in 190 ml. of anhydrous methylene chloride is cooled to −78°C in a dry ice-acetone bath and treated with 25 ml. of boron tribromide. The stirred mixture is allowed to warm rapidly to 0°C and kept at this temperature for 50 minutes. To the resulting solution is added 270 ml. of ether to decompose excess boron tribromide, maintaining the reaction mixture at 0°C. The mixture is then poured into a vigorously stirred slurry of 95 g. of sodium bicarbonate in 500 ml. of a saturated aqueous solution of sodium potassium tartrate; the organic layer is separated and the aqueous phase extracted with methylene chloride. The combined organic extracts are dried over magnesium sulfate and evaporated under reduced pressure. The residue is purified by crystallization from chloroform to afford (2'α-hydroxy-4'α-acetoxy-5'β-hydroxymethylcyclopent-1'α-yl)-acetic acid 1,2'-lactone, identical to the obtained in part A.

C. To a suspension of 60 g. of diatomaceous earth (dried for 24 hours at 105°C) and 60 g. of chromium trioxidedipyridine complex (prepared as described by J. C. Collins et al., *Tetrahedron Letters*, 3363 (1968)) in 800 ml. of anhydrous methylene chloride, cooled to 0° to 2°C is added under stirring 4.7 g. of (2'α-hydroxy-4'α-acetoxy-5'β-hydroxymethylcyclopent-1'α-yl)- acetic acid 1,2'-lactone dissolved in 500 ml. of methylene chloride and the mixture is stirred for 20 minutes further, maintaining the temperature at about 0°C; 20.8 g. of sodium bisulfate are then added and the mixture is stirred for an additional 10 minute period, the solids are separated by filtration and washed with methylene chloride. The combined filtrates are evaporated to dryness under reduced pressure, at a temperature below 0°C, obtaining (2'α-hydroxy-4'α-acetoxy-5'β-formylcyclopent-1'α-yl)-acetic acid 1,2'-lactone as a homogenous oil.

EXAMPLE 1

A. Preparation of dimethyl 2-oxoheptylphosphonate.

A solution of 100 g. of dimethyl methylphosphonate in 670 ml. of anhydrous tetrahydrofuran is cooled to −78°C under an argon atmosphere. To the cold solution is added dropwise under stirring and under an argon atmosphere, 495 ml. of 0.1M solution of n-butyllithium in tetrahydrofuran, maintaining the temperature at −70°C. When the addition is complete the reaction mixture is maintained under the same conditions for 10 additional minutes, a solution of 58 ml. of methyl caproate dissolved in 187 ml. of tetrahydrofuran is then carefully added, maintaining the temperature at −78°C. The reaction mixture is stirred at −78°C for 2 hours followed by stirring for 4 hours at room temperature. The excess base is neutralized with acetic acid and the solvent is evaporated under high vacuo. The residue is dissolved in ether-water (1:1, 950 ml. each), the ethereal phase is separated, washed with water and dried over magnesium sulfate. The ether is evaporated and the residue is purified by vacuum distillation, thus obtaining the pure dimethyl 2-oxo-heptylphosphonate.

B. To a suspension of 1.8 g. of sodium hydride (previously washed with pentane, under argon) in 200 ml. of dimethoxyethane freshly distilled from lithium aluminum hydride is added, under stirring and under an atmosphere of argon, a solution of 8.1 g. of dimethyl 2-oxoheptylphosphonate in 100 ml. of anhydrous dimethoxyethane. The reaction mixture is stirred for 30 minutes at room temperature and 4.5 g. of (2'α-hydroxy-4'α-acetoxy-5'β-formylcyclopent-1'α-yl)-acetic acid 1,2'-lactone dissolved in 120 ml. of dimethoxyethane are added. The reaction mixture is stirred at room temperature for two hours further, it is then carefully neutralized with acetic acid (to pH 7) and evaporated to dryness under reduced pressure at a temperature below 30°C. The solid residue is purified by chromatography using an 80 × 20 cm. silica plate and a benzene-dioxane (90:10) mixture as eluant, to obtain [2'α-hydroxy-4'α-acetoxy-5'β-(3''-oxo-oct-1'' (t)-en-1''-yl)-cyclopent-1'α-yl]-acetic acid 1,2'-lactone, [2'α-hydroxy-5'β-(3''-oxo-oct-1''(t)-en-1''-yl)-cyclopent-4'-en-1'p58p2 α-yl]-acetic acid 1,2'-lactone and a small amount of dimethyl 2-oxoheptylphosphonate.

EXAMPLE 2

A solution of 1.1 g. of [2'α-hydroxy-5'β-(3''-oxo-oct-1''(t)-en-1''-yl)-cyclopent-4'-en-1'α-yl]-acetic acid 1,2'-lactone in 40 ml. of diglyme is heated to the boiling point and about 10 ml. are distilled off to remove moisture. To the stirred refluxing solution are added, dropwise and under continuous distillation, 22 g. of sodium chlorodifluoroacetate dissolved in 40 ml.

of diglyme. After completion of the addition, the reaction mixture is refluxed for ten additional minutes. It is then evaporated to dryness under reduced pressure, the oily residue is dissolved in methylene chloride and filtered through alumina. The filtrate is evaporated to dryness and the residue purified by thin-layer chromatography using hexane-ethyl acetate (60:40) as eluant, to obtain two isomeric difluoromethylene compounds, namely [2'α-hydroxy-4'α,5'α-difluoromethylene-5'β-(3''-oxo-oct-1'''(t)-en-1'''-yl)-cyclopent-1'α-yl]-acetic acid 1,2'-lactone and [2'α-hydroxy-4'β,5'β-difluoromethylene-5'α-(3''-oxo-oct-1'''(t)-en-1'''-yl)-cyclopent-1'α-yl]-acetic acid 1,2'-lactone which are recrystallized from methylene chloride-diethyl ether and diethyl ether-hexane, respectively.

EXAMPLE 3

To a stirred solution of 400 mg. of [2'α-hydroxy-4'α,5'α-difluoromethylene-5'β-(3''-oxo-oct-1'''(t)-en-1'''-yl)-cyclopent-1'α-yl]-acetic acid 1,2'-lactone in 5 ml. of dimethoxyethane, freshly distilled from lithium aluminum hydride, are added 1.2 ml. of zinc borohydride reagent in anhydrous dimethoxyethane. The reaction mixture is stirred for 90 minutes at room temperature, and then treated with a saturated solution of sodium bitartrate until the resulting evolution of gas ceases. It is then diluted with methylene chloride, dried over magnesium sulfate and evaporated to dryness under vacuo at a temperature below 30°C, to yield [2-'α-hydroxy-4'α,5'α-difluoromethylene-5'β-(3''α-hydroxyoct-1'''(t)-en-1'''-yl)-cyclopent-1'α-yl]-acetic acid 1,2'-lactone in mixture with the 3''β-hydroxy isomer.

This oily mixture is separated into the individual isomers by t.l.c. (i.e. thin-layer chromatography) using a mixture of methylene chloride-acetone (75:25) as eluant.

In a similar fashion, starting from [2'α-hydroxy-4'β,5'β-difluoromethylene-5'α-(3''-oxo-oct-1'''(t)-en-1'''-yl)-cyclopent-1'α-yl]-acetic acid 1,2'-lactone, there is obtained a mixture of [2'α-hydroxy-4'β,5'β-difluoromethylene-5'α-(3''α-hydroxyoct-1'''(t)-en-1'''-yl)-cyclopent-1'α-yl]-acetic acid 1,2'-lactone and the 3''β-hydroxy isomer which is separated into the individual isomers by thin-layer chromatography.

The zinc borohydride reagent is prepared from 0.025 mol of fused zinc chloride, 0.050 mol of sodium borohydride in 50 ml. of dimethoxyethane, stirring the mixture for 16 hours and filtering the insoluble material under argon atmosphere.

EXAMPLE 4

To a solution of 2 g. of [2'α-hydroxy-4'α,5'α-difluoromethylene-5'β-(3''α-hydroxyoct-1'''(t)-en-1'''-yl)-cyclopent-1'α-yl]-acetic acid 1,2'-lactone in 20 ml. of methylene chloride are added 20 mg. of p-toluenesulfonic acid, and 2 ml. of freshly distilled dihydropyran. The reaction mixture is stirred for 15 minutes, at room temperature, a few drops of pyridine are added and diluted with ether. The ethereal solution is washed with 100 ml. of 50% aqueous sodium chloride solution and then with saturated aqueous sodium chloride solution. The organic phase is separated, dried over magnesium sulfate and evaporated to dryness under reduced pressure, at approximately 0°C. The oily residue is purified by thin-layer chromatography using chloroform-methanol 9:1 as eluant, to produce the pure [2'α-hydroxy-4'α,5'α-difluoromethylene-5'β-(3''α-tetrahydropyranyloxyoct-1'''(t)-en-1'''-yl)-cyclopent-1'α-yl]-acetic acid 1,2'-lactone.

By the same method [2'α-hydroxy-4'β,5'β-difluoromethylene-5'α-(3''α-hydroxyoct-1'''(t)-en-1'''-yl)-cyclopent-1'α-yl]-acetic acid 1,2'-lactone is converted into the corresponding 3''-tetrahydropyranylether.

EXAMPLE 5

One gram of [2'α-hydroxy-4'α,5'α-difluoromethylene-5'β-(3''α-tetrahydropyranyloxyoct-1'''(t)-en-1'''-yl)-cyclopent-1'α-yl]-acetic acid 1,2'-lactone is dissolved in 20 ml. of anhydrous toluene. The solution is cooled to −60°C and to the cold solution is added a solution of 650 mg. of diisobutylaluminum hydride in 2.7 ml. of anhydrous toluene, stirring the reaction mixture for 15 minutes at −60°C. It is then diluted with methanol until the evolution of gas ceases, the mixture is stirred for 15 minutes further at room temperature and diluted with ether. The organic phase is then separated, washed with saturated sodium chloride solution, dried over magnesium sulfate and evaporated to dryness at about 0°C to produce [2'α-hydroxy-4'α,5'α-difluoromethylene-5'β-(3''α-tetrahydropyranyloxyoct-1'''(t)-en-1'''-yl)-cyclopent-1'α-yl]-acetaldehyde 1,2'-hemiacetal.

By the same method, [2'α-hydroxy-4'β,5'β-difluoromethylene-5'α-(3''α-tetrahydropyranyloxyoct-1'''(t)-en-1'''-yl)-cyclopent-1'α-yl]-acetic acid 1,2'-lactone is converted into [2'α-hydroxy-4'β,5'β-difluoromethylene-5'α-(3''α-tetrahydropyranyloxyoct-1'''(t)-en-1'''-yl)-cyclopent-1'α-yl]-acetaldehyde 1,2'-hemiacetal.

EXAMPLE 6

A stirred suspension of 440 mg. of sodium hydride in 5 ml. of anhydrous dimethylsulfoxide is heated to 80°C for half an hour under an argon atmosphere; 1.4 ml. of the resulting solution are added to a solution of 380 mg. of dried 5-triphenylphosphoniopentanoic acid bromide in 0.8 ml. of anhydrous dimethylsulfoxide, under an argon atmosphere, and under stirring. The reaction mixture is stirred for 5 minutes, 150 mg. of [2'α-hydroxy-4'α,5'α-difluoromethylene-5'β-(3''α-tetrahydropyranyloxyoct-1'''(t)-en-1'''-yl)-cyclopent-1'α-yl]-acetaldehyde 1,2'-hemiacetal dissolved in 1 ml. of dimethylsulfoxide is added, and the reaction mixture is stirred at room temperature for 18 hours. The solvent is then evaporated under reduced pressure at a temperature below 35°C and the residue is dissolved in 10 ml. of water. The neutral products are extracted with ethyl acetate:ether (1:1) (4 × 4 ml.). The aqueous phase is acidified with saturated aqueous oxalic acid solution to pH 2, and extracted several times with a mixture of pentane:ether (1:1). The combined organic extracts are washed with saturated aqueous sodium chloride solution, dried over magnesium sulfate and evaporated to dryness at a temperature not higher than 20°C. Purification of the residue by thin-layer chromatography, using chloroform:methanol, 9:1 as eluant, affords the pure 9α-hydroxy 11α,12α-difluoromethylene-15α-tetrahydropyranyloxyprosta-5-cis,13-trans-dienoic acid.

By the same method, [2'α-hydroxy-4'α,5'α-difluoromethylene-5'α-(3''α-tetrahydropyranyloxyoct-1'''(t)-en-1'''-yl)-cyclopent-1'α-yl]-acetaldehyde 1,2'- hemiacetal is converted into 9α-hydroxy-11β,12β-difluoromethylene-15α-tetrahydropyranyloxy-12-epiprosta-5-cis,13-trans-dienoic acid.

The 5-triphenylphosphoniopentanoic acid bromide used as reagent is prepared by reflux of a mixture of 9.5 g. of 5-bromopentanoic acid, 14.4 g. of triphenylphosphine and 100 ml. of acetonitrile for about 70 hours. The insoluble material is separated by filtration and the filtrate is concentrated to a small volume. The product is crystallized by addition of ether, and is further purified by two subsequent recrystallizations from acetonitrile-ether.

EXAMPLE 7

A mixture of 173 mg. of 9α-hydroxy-11α,12α-difluoromethylene-15α-tetrahydropyranyloxyprosta-5-cis,13-trans-dienoic acid, 0.45 ml. of tetrahydrofuran and 4.5 ml. of 65% aqueous acetic acid is stirred at 40°C for 4 hours, cooled to 0°C and evaporated to dryness under reduced pressure; the oily residue is purified by thin-layer chromatography using chloroform:methanol (9:1) as eluant, thus yielding the pure 9α,15α-dihydroxy-11α,12α-difluoromethyleneprosta-5-cis,13-trans-dienoic acid.

In another experiment the reaction mixture is kept at room temperature for 18 hours, obtaining the same results.

Likewise 9α-hydroxy-11β,12β-difluoromethylene-15α-tetrahydropyranyloxy-12-epiprosta-5-cis,13-trans-dienoic acid is converted into 9α,15α-dihydroxy-11β,12β-difluoromethylene-12-epiprosta-5-cis,13-trans-dienoic acid.

EXAMPLE 8

To a solution of 100 mg. of 9α-hydroxy-11α,12α-difluoromethylene-15α-tetrahydropyranyloxyprosta-5-cis,13-trans-dienoic acid in 10 ml. of methanol is added a solution of 50 mg. of oxalic acid in 1 ml. of water, and the reaction mixture is maintained at room temperature for 1 hour. It is then diluted with water and extracted with methylene chloride. The organic extract is washed with sodium chloride solution, dried over magnesium sulfate and evaporated to dryness under reduced pressure. The oily residue is purified by thin-layer chromatography using chloroform:methanol (9:1) as eluant, thus, yielding the pure 9α,15α-dihydroxy-11α,12α-difluoromethyleneprosta-5-cis,13-trans-dienoic acid.

EXAMPLE 9

A solution of 100 mg. of 9α-hydroxy-11α,12α-difluoromethylene-15α-tetrahydropyranyloxyprosta-5-cis,13-trans-dienoic acid in 4 ml. of purified acetone is cooled to −10°C and treated under an atmosphere of nitrogen and with stirring, with 0.15 ml. of an 8N solution of chromic acid (prepared by mixing 26 g. of chromium trioxide with 23 ml. of concentrated sulfuric acid and diluting with water to 100 ml.). The reaction mixture is stirred for 30 minutes further at −10°C, 0.15 ml. of isopropanol are then added to destroy the excess reagent, and the mixture diluted with ethyl acetate. The solution is immediately washed three times with sodium chloride solution, dried over magnesium sulfate and evaporated to dryness under reduced pressure, to give 9-keto-11α,12α-difluoromethylene-15α-tetrahydropyranyloxyprosta-5-cis,13-trans-dienoic acid, which is purified by thin-layer chromatography using chloroform:methanol (9:1) as eluant.

Upon cleavage of the tetrahydropyranyloxy moiety with acetic acid-water (65:35), in accordance with the method of Example 7, there is obtained 9-keto-11α,12α-difluoromethylene-15α-hydroxyprosta-5-cis,13-trans-dienoic acid.

Likewise, 9α-hydroxy-11β,12β-difluoromethylene-15α-tetrahydropyranyloxy-12-epiprosta-5-cis,13-trans-dienoic acid is successively converted into 9-keto-11β,12β-difluoromethylene-15α-tetrahydropyranyloxy-12-epiprosta-5-cis,13-trans-dienoic acid and 9-keto-11β,12β-difluoromethylene-15α-hydroxy-12-epiprosta-5-cis,13-trans-dienoic acid.

EXAMPLE 10

Fifteen milligrams of 9-keto-11α,12α-difluoromethylene-15α-hydroxyprosta-5-cis,13-trans-dienoic acid is dissolved in a mixture of 2 ml. of benzene and 3 ml. of acetone containing 5 mg. of freshly prepared tris-(triphenylphosphine)chlororhodium, at room temperature. The resulting mixture is stirred in a hydrogen atmosphere and aliquots are removed at periodic intervals. The aliquots are esterified with diazomethane and analyzed by gas liquid chromatography to determine whether hydrogenation has been completed. When the hydrogenation is determined to be essentially complete (ca. six hours), the reaction mixture is applied to 20% wt. silver nitrate impregnated silica gel (G) preparative plates developing with chloroform:methanol:acetic acid:water in a 95:75:1:0.6 parts by volume ratio. The zone corresponding to the 9-keto-11α,12α-difluoromethylene-15α-hydroxyprost-13-trans-enoic acid portion is eluted with a 90:10, by vol., into a mixture of chloroform and methanol yielding pure 9-keto-11α,12α-difluoromethylene-15α-hydroxyprost-13-trans-enoic acid.

Similarly by following the same procedure using the corresponding prosta-5-cis,13-trans-dienoic acids as starting materials, the following compounds are respectively prepared:

11α,12α-difluoromethylene-9α,15α-dihydroxyprost-13-trans-enoic acid;

9-keto-11β,12β-difluoromethylene-15α-hydroxy-12-epiprost-13-trans-enoic acid; and 11β,12β-difluoromethylene-9α,15α-dihydroxy-12-epiprost-13-trans-enoic acid.

EXAMPLE 11

To a solution of 100 mg. of 9α,15α-dihydroxy-11α,12α-difluoromethyleneprosta-5-cis,13-trans-dienoic acid in 5 ml. of ether is added 1 ml. of an ethereal solution of diazomethane, and the reaction mixture is maintained at room temperature for 10 minutes. The solvents and excess reagents are eliminated by vacuum distillation and the residue is purified by thin-layer chromatography to afford 9α,15α-dihydroxy-11α,12α-difluoromethyleneprosta-5-cis,13-trans-dienoic acid methyl ester.

In a similar manner but using diazoethane in place of diazomethane, the ethyl ester of 9α,15α-dihydroxy-11α,12α-difluoromethyleneprosta-5-cis,13-trans-dienoic acid is obtained.

Likewise, 9-keto-11α,12α-difluoromethylene-15α-hydroxyprosta-5-cis,13-trans-dienoic acid and 9-keto-11β,12β-difluoromethylene-15α-hydroxy-12-epiprosta-5-cis,13trans-dienoic acid are converted into the corresponding methyl and ethyl esters.

Similarly by following the same procedure, the corresponding methyl and ethyl acid esters of the products

EXAMPLE 12

A mixture of 100 mg. of 9α,15α-dihydroxy-11α,12α-difluoromethyleneprosta-5-cis,13-trans-dienoic acid, 0.4 ml. of pyridine and 0.8 ml. of acetic anhydride is kept at room temperature for one hour. The reaction mixture is then evaporated to dryness under reduced pressure and the residue is dissolved in ethyl acetate. Fifty milligrams of sodium bisulfate are added and the solution is filtered through Celite, diatomaceous earth. The filtrate is evaporated to dryness to yield 9α,15α-diacetoxy-11α,12α-difluoromethyleneprosta-5-cis,13-trans-dienoic acid.

By the same process but using propionic, caproic and cyclopentylpropionic anhydride as esterifying agents, there are respectively obtained the 9α,15α-dipropionoxy-9α,15α-dicaproxy and 9α,15α-dicyclopentylpropionoxy derivatives of 11α,12α-difluoromethyleneprosta-5-cis,13-trans-dienoic acid.

In a similar manner, 9-keto-11α,12α-difluoromethylene15α-hydroxyprosta-5-cis,13-trans-dienoic acid and 9-keto-11β,12β-difluoromethylene-15α-hydroxy-12-epiprosta-5-cis,13-trans-dienoic acid and the products of Example 10 are converted into the corresponding acetates, propionates, caproates and cyclopentylpropionates.

EXAMPLE 13

To a solution of 100 mg. of 9α,15α-dihydroxy-11α,12α-difluoromethylprosta-5-cis,13-trans-dienoic acid in 10 ml. of methanol is added 3 ml. of a 0.1N solution of sodium hydroxide, and the mixture is stirred at room temperature for 1 hour. It is then evaporated to dryness under reduced pressure, to give the sodium salt of 9α,15α-dihydroxy-11α,12α-difluoromethyleneprosta-5-cis,13-trans-dienoic acid.

By employing 1.1 molar equivalents of potassium hydroxide (in the form of an 0.1N solution) in place of sodium hydroxide in the above procedure, the potassium salt of 9α,15α-dihydroxy-11α,12α-difluoromethyleneprosta-5-cis,13-trans-dienoic acid is obtained.

Similarly, the sodium and potassium salts of the other prostanoic and 12-epiprostanoic acid derivatives obtained in the previous Examples are produced.

EXAMPLE 14

To a solution of 100 mg. of 9α,15α-dihydroxy-11α,12α-difluoromethyleneprosta-5-cis,13-trans-dienoic acid in 10 ml. of methanol is added a mixture of 3ml. of concentrated ammonium hydroxide solution and 5 ml. of methanol. The resulting mixture is stirred for 2 hours at room temperature and then evaporated to dryness to yield the ammonium salt of 9α,15α-dihydroxy-11α,12α-difluoromethyleneprosta-5-cis,13-trans-dienoic acid.

By employing dimethylamine, diethylamine or dipropylamine in place of ammonium hydroxide in the above process, the corresponding salts of 11α,12α-difluoromethylene-9α,15α-dihydroxyprosta-5-cis,13-trans-dienoic acid are obtained.

In a similar manner, the ammonia, dimethylamine, diethylamine and dipropylamine salts of 9α,15α-dihydroxy-11β,12β-difluoromethylene-12-epiprosta-5-cis,13-trans-dienoic acid and 9-keto-11α,12α-difluoromethylene-15α-hydroxyprosta-5-cis,13-trans-dienoic acid and the products of Example 10 are obtained.

Obviously many modifications and variations of the invention, described herein above and below in the Claims, can be made without departing from the essence and scope thereof.

What is claimed is:

1. A compound selected from the group of isomers and racemic mixtures thereof having the formulas:

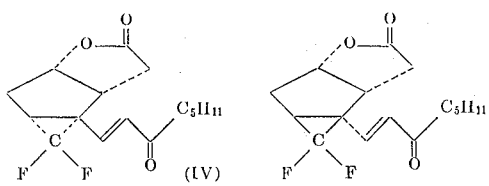

2. The compound of claim 1 of formula IV.
3. The compound of claim 1 of formula V.
4. The compound of claim 1 wherein said compound is a racemic mixture.

* * * * *

PO-1050
(5/69)

UNITED STATES PATENT OFFICE
CERTIFICATE OF CORRECTION

Patent No. 3,872,107  Dated March 18, 1975

Inventor(s) PIERRE CRABBE

It is certified that error appears in the above-identified patent and that said Letters Patent are hereby corrected as shown below:

Column 2, line 58, "cycic" should read --- cyclic. Column 2, line 60, "secbutyl" should read --- sec-butyl ---. Column 2, line 60, "n-phenyl" should read --- n-pentyl ---. Column 5, line 47, "of difluorocyclopropyl" should read --- of a difluorocyclopropyl ---. Column 9, line 4, "dimenthylamino" should read --- dimethylamino ---. Column 10, line 62, "(4) R$^4$" should read --- (4) (R$^4$ ---. Column 11, line 14, delete "methoxymethylcyclopent-1'β-". Column 11, line 17, "1'β-yl)" should read --- 1'α-yl) ---. Column 12, line 49 "passing of stream" should read --- passing a stream ---. Column 12, line 58, "tooled" should read --- cooled ---. Column 12, line 63, "soilid" should read --- solid ---. Column 13, line 28, "a dry-ice to a" should read --- a dry-ice jacket to a ---. Column 14, line 60, "1'β-yl" should read --- 1'α-yl ---. Column 15, line 23, "αyl" should read --- α-yl ---. Column 16, line 57, delete "p58p2". Column 20, line 65, "3trans" should read --- 3-_trans_ ---.

Signed and Sealed this fourteenth Day of October 1975

[SEAL]

Attest:

RUTH C. MASON
Attesting Officer

C. MARSHALL DANN
Commissioner of Patents and Trademarks